United States Patent
Scholz et al.

(10) Patent No.: US 10,906,375 B2
(45) Date of Patent: Feb. 2, 2021

(54) METHOD FOR CONTROLLING A VENTILATION SYSTEM FOR A VEHICLE INTERIOR

(71) Applicant: Bayerische Motoren Werke Aktiengesellschaft, Munich (DE)

(72) Inventors: Bernhard Scholz, Landshut (DE); Karsten Meindl, Ampfing (DE); Michael Nirschl, Kumhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/585,219

(22) Filed: May 3, 2017

(65) Prior Publication Data
US 2017/0232819 A1    Aug. 17, 2017

Related U.S. Application Data

(63) Continuation of application No. PCT/EP2015/079272, filed on Dec. 10, 2015.

(30) Foreign Application Priority Data

Dec. 19, 2014   (DE) .................. 10 2014 226 530

(51) Int. Cl.
  *B60H 1/24*   (2006.01)
  *B60H 1/00*   (2006.01)
(52) U.S. Cl.
  CPC ..... *B60H 1/00849* (2013.01); *B60H 1/00735* (2013.01); *B60H 1/00778* (2013.01); *B60H 1/248* (2013.01)
(58) Field of Classification Search
  USPC .............................. 454/69–70, 162
  See application file for complete search history.

(56) References Cited

U.S. PATENT DOCUMENTS

| | | | |
|---|---|---|---|
| 2006/0199528 A1* | 9/2006 | Rivera | B60H 1/249 454/359 |
| 2007/0197159 A1* | 8/2007 | Byczynski | F24F 11/0001 454/340 |

(Continued)

FOREIGN PATENT DOCUMENTS

| | | |
|---|---|---|
| CN | 102009581 A | 4/2011 |
| CN | 104044539 A | 9/2014 |

(Continued)

OTHER PUBLICATIONS

International Search Report (PCT/ISA/210) issued in PCT Application No. PCT/EP2015/079272 dated Mar. 17, 2016 with English translation (five pages).

(Continued)

*Primary Examiner* — Vivek K Shirsat
*Assistant Examiner* — Ko-Wei Lin
(74) *Attorney, Agent, or Firm* — Crowell & Moring LLP

(57) ABSTRACT

A method is provided for pressure equalization when shutting a vehicle door or tailgate, wherein the door or tailgate is designed to close an opening into a vehicle interior, in particular to enable loading or unloading or entering or exiting. An airflow can be conveyed into the vehicle interior from outside the motor vehicle interior through an air inlet opening via an air inlet system. The air inlet opening can be closed via a closure device. The method detects a vehicle standstill mode; detects an opened vehicle door or tailgate; controls the closure device of the air inlet opening; and opens the air inlet opening.

8 Claims, 2 Drawing Sheets

(56) References Cited

U.S. PATENT DOCUMENTS

| | | | |
|---|---|---|---|
| 2008/0115517 A1 | 5/2008 | Tacey et al. | |
| 2011/0056569 A1 | 3/2011 | Chambo et al. | |
| 2013/0154792 A1* | 6/2013 | Reed | E05F 15/43 340/3.1 |
| 2014/0273786 A1* | 9/2014 | Wade | B60H 1/00735 454/75 |

FOREIGN PATENT DOCUMENTS

| | | | |
|---|---|---|---|
| DE | 197 54 703 A1 | 6/1999 | |
| DE | 10 2007 051 283 A1 | 4/2009 | |
| DE | 102007051283 A1 * | 4/2009 | B60H 1/00764 |
| DE | 10 2010 035 805 A1 | 4/2011 | |
| DE | 10 2011 017 372 A1 | 10/2012 | |
| DE | 10 2011 102 213 A1 | 11/2012 | |
| KR | 10-2009-0062521 A | 6/2009 | |

OTHER PUBLICATIONS

German-language Written Opinion (PCT/ISA/237) issued in PCT Application No. PCT/EP2015/079272 dated Mar. 17, 2016 (five pages).

German-language Office Action issued in counterpart German Application No. 10 2014 226 530.4 dated Jul. 15, 2015 (five pages).

Chinese Office Action issued in Chinese counterpart application No. 201580048040.6 dated Jul. 3, 2018, with English translation (Thirteen (13) pages).

Chinese Office Action issued in Chinese counterpart application No. 201580048040.6 dated Jan. 9, 2019, with partial English translation (Eleven (11) pages).

* cited by examiner

METHOD FOR CONTROLLING A VENTILATION SYSTEM FOR A VEHICLE INTERIOR

CROSS REFERENCE TO RELATED APPLICATIONS

This application is a continuation of PCT International Application No. PCT/EP2015/079272, filed Dec. 10, 2015, which claims priority under 35 U.S.C. § 119 from German Patent Application No. 10 2014 226 530.4, filed Dec. 19, 2014, the entire disclosures of which are herein expressly incorporated by reference.

BACKGROUND AND SUMMARY OF THE INVENTION

The invention relates to a method for controlling a ventilation system for the vehicle interior in a motor vehicle during the closure of the vehicle door or vehicle tailgate, and to a motor vehicle having a system of this type.

DE 10 2010 035 805 A1 discloses an apparatus for controlling the pressure equalization during the closure of a vehicle door tailgate.

In motor vehicles, the quality or value of a vehicle is assessed using various criteria. Some of the criteria are quantifiable, such as gap dimensions between vehicle body parts, but others, such as the sense of quality of surface materials, can be detected substantively only qualitatively. The closure and opening of vehicle doors and/or vehicle tailgates is a further one of these features which are to be assessed qualitatively. Here, it is a general goal to produce a sense of quality which is as high as possible in a motor vehicle.

With respect to the opening and closure of vehicle doors or vehicle tailgates, firstly what are known as direct influence factors have been shown to be substantial influence factors, such as the seal counterpressure of the door seal, friction conditions within the door hinge and the characteristic of the door brake. Furthermore, the pressure within the vehicle interior which can be closed by way of the respective vehicle door or vehicle tailgate has been proven to be a further influence factor, as an indirect influence factor. Here, a partially great pressure increase in the vehicle interior is produced by way of the closure of a vehicle door or vehicle tailgate.

DE 10 2010 035 805 A1 discloses a device having a plurality of elastic blade elements, by way of which an opening in the vehicle interior can be closed. In the case of pressure differences between the vehicle interior and the vehicle exterior, which can for example be caused during the closure of the vehicle door or vehicle tailgate, the device makes a pressure equalization between the inside and the outside possible.

It is an object of the invention to provide a method, which is improved over the known prior art, for pressure equalization during the closure of a vehicle door or vehicle tailgate.

This and other objects are achieved by way of a method and by way of a motor vehicle in accordance with embodiments of the invention.

Measurements have shown that a partially great rise in the air pressure within the vehicle interior occurs during the closure of the vehicle door or vehicle tailgate. In relation to the tailgate, in particular, this occurs when the luggage compartment merges directly into the passenger compartment, and is the case in hatchback, touring or van vehicles (one or two box design). Furthermore, the pressure rise is particularly pronounced, in particular, when only a single vehicle door or only the vehicle tailgate is open and is then closed. A pressure rise of this type can be reduced by way of a method according to the invention, and the closing comfort of the vehicle door or vehicle tailgate can be increased in this way.

In motor vehicles which have a closure device for the air inlet opening, this is closed when the motor vehicle is at a standstill, in particular during a parking phase, in order to prevent uncontrolled entry or exit of air and/or foreign substances in relation to the vehicle interior.

The method according to the invention relates to the closure of doors or tailgates, but at least to the closure of a door or tailgate which is provided for the selective closure of at least one opening, in particular an entry or loading region into a vehicle interior.

Conventional vehicles have air inlet systems, by way of which an air flow can be conveyed from outside the motor vehicle interior through an air inlet opening into the vehicle interior. Furthermore, air inlet systems of this type can also have air circulation apparatuses, in which, even if no air flow can be conveyed from outside the motor vehicle into it, an air flow can still be conveyed in a closed circulation out of and into the vehicle interior.

The air inlet system can be controlled, in particular, by way of flap devices. This control is to be understood to mean that certain lines are selectively opened, closed, or changed in terms of their flow cross section. For example, different outlet openings into the vehicle interior can be actuated by way of flap devices of this type. Furthermore, at least one closure device can also be actuated, in order, in particular, to reduce or to prevent an inflow of air from outside the vehicle interior, in particular from outside the motor vehicle. For this purpose, at least one air inlet opening can be closed selectively by way of the closure device.

According to the invention, the method for improving the pressure equalization has the following steps:
- detection of a vehicle standstill mode,
- detection of an open vehicle door or vehicle tailgate,
- actuation of the closure device,
- opening of the air inlet opening.

A pressure equalization air flow is produced, in particular, by way of the opening of the closure device of the air inlet opening during the closure of the vehicle door or vehicle tailgate. The pressure equalization air flow moves counter to the "normal" flow direction (air inlet) through the air inlet opening from inside to outside the vehicle interior.

In the context of the invention, a vehicle interior is to be understood to mean, in particular, the passenger cell or, further preferably, the luggage compartment.

In the context of the invention, an air inlet system is to be understood to mean a system, by way of which the entry of air from the environment which surrounds the motor vehicle into the vehicle interior can be controlled. An air inlet system is preferably to be understood to mean an apparatus having at least one tubular line, preferably at least one filter device and preferably at least one air inlet opening. Here, the air inlet opening is preferably set up to make an air flow possible from outside the motor vehicle into the vehicle interior. The air inlet opening can be closed by way of a closure device. Further preferably, a closure device is to be understood to mean a flap mechanism, preferably a valve device or further preferably a slide device.

Further preferably, an air inlet system has an air conveying device. Here, in the context of this invention, an air conveying device is to be understood to mean a device for generating an air flow from outside the vehicle through the air inlet opening into the vehicle interior. An air conveying device is preferably to be understood to mean a blower device or preferably a fan device.

In the context of the invention, a vehicle standstill mode is to be understood to mean a state or operating state of the motor vehicle, in which the motor vehicle is parked. Figuratively speaking, the vehicle is parked in a vehicle standstill mode when it is set into a parking situation. Further preferably, in order to determine a vehicle standstill mode, it is detected whether a so-called ignition key is removed from the vehicle. Further preferably, in order to detect a vehicle standstill mode, it is recognized/detected, in particular via sensors in vehicle seats or preferably movement sensors, whether persons are residing in the vehicle interior. Further preferably, in order to detect a vehicle standstill mode, it is detected whether the drive system of the motor vehicle is ready for operation. Here, in the context of this invention, the operational readiness of the drive system is to be understood to mean that the motor vehicle can be accelerated immediately by a driver. For example, a vehicle with a so-called start/stop automatic system can be accelerated immediately while waiting at a traffic light, despite the drive machine being switched off. Further preferably, in order to detect a vehicle standstill mode, it is detected whether at least one, preferably two and particularly preferably all of the following conditions are met:

no passengers in the vehicle,
vehicle ventilation/climate control system in a rest mode,
no operational readiness of the motor vehicle.

A vehicle standstill mode can be detected reliably, in particular, by way of the abovementioned conditions.

According to the invention, if a vehicle standstill mode can be recognized, that is to say if the vehicle is transferred into a parking situation, a control signal is output to the air inlet opening for the case where a vehicle door or tailgate is open, with the result that this opens the air inlet opening. In the case of an open air inlet opening, an air flow can enter into the vehicle interior through the air inlet opening, in particular, or can exit through said air inlet opening. If the vehicle door or tailgate is then closed, this results in an air pressure increase in the vehicle interior. The increased air pressure leads to a pressure equalization air flow flowing to outside the vehicle interior through the open air inlet opening.

In one preferred embodiment, the acceleration or the movement of the vehicle door or tailgate is detected. Further preferably, the closure device is not opened until a closure of the vehicle door or tailgate is detected. Here, a closure of the vehicle door or tailgate is detected, in particular, when the vehicle door or tailgate is accelerated or moved out of an open position into a closed position. Further preferably, an acceleration or movement is detected only when it exceeds a defined threshold value. The threshold value is preferably 0.01 m/s$^2$ or greater for the acceleration and 0.1 m/s for the movement. More precise actuation of the air inlet opening and/or the closure device is made possible and therefore an improved method can be achieved, in particular, by virtue of the fact that the acceleration or movement of the vehicle door or tailgate is used for the method according to the invention.

In one preferred embodiment of the method, the number of open vehicle doors or vehicle tailgates is detected, and the method according to the invention is carried out only when only one vehicle door or only one vehicle tailgate is open and is then closed. A pressure equalization by the ventilation system is necessary and appropriate, in particular, if a further vehicle door or vehicle tailgate is open.

In one preferred embodiment, a fan device is actuated for conveying an air flow through the air inlet opening from within the vehicle interior to the outside if the closure device is open at least partially or completely. A fan device which is set up, in normal operation, to convey an air flow from outside the vehicle interior into it is preferably used to convey said air flow. Further preferably, a fan device is to be understood to mean a blower device or ventilator device. In particular, the fan device is to be understood to mean a fan or blower which is used to ventilate or control the climate of the vehicle interior during the normal operation of the vehicle. An improved pressure equalization can be achieved and therefore an improved method can be provided, in particular, by way of the use of a fan device to generate an additional air flow out of the vehicle interior during the closure of the vehicle door or tailgate.

In one preferred embodiment, the closure device remains open for a defined dead time t1 after the closure of the vehicle door or tailgate. The closure device is preferably closed after the dead time t1 elapses. The dead time is preferably selected from a range which is >0.01 second, preferably >0.1 second, with preference >1 second and particularly preferably >2 seconds. Furthermore, the range for the dead time t1 is <1 minute, preferably <30 seconds, with preference <20 seconds and particularly preferably <10 seconds. In particular, a dead time t1 can achieve a situation where a complete pressure equalization between the vehicle interior and the exterior space is set and therefore an improved method can be provided before the closure of the closure device.

In one preferred embodiment, in addition to the air inlet opening, a circulation air flap is actuated in the air inlet system or in a climate control system of the motor vehicle. In the context of this invention, a circulation air flap is to be understood to be a device for controlling an air flow in the air inlet system or in a ventilation system for the vehicle interior. The circulation air flap is preferably set up to prevent an outflow of the air to outside the vehicle. An additional space for the pressure equalization can be released, in particular, by way of the opening of the circulation air flap in the air inlet system or climate control system, and an improved pressure equalization can be achieved in this way.

The method according to the invention is preferably used in a motor vehicle. Further, the motor vehicle has, in particular, a vehicle interior which can be closed by way of at least one vehicle door or tailgate. Further, the motor vehicle has a ventilation system which is set up to ventilate the vehicle interior. To this end, the ventilation system has at least one air inlet opening, through which an air flow can be conveyed from outside the vehicle interior, in particular from outside the motor vehicle, into the vehicle interior. Further preferably, the air inlet opening can be closed by way of a closure device. The closure device is preferably configured as a flap device or valve device or slide device. According to the invention, the closure of the air inlet opening by way of the closure device can be controlled in accordance with a method according to the invention. An improved pressure equalization during the closure of a vehicle door or tailgate is achieved, in particular, by way of the actuation of the closure device in a way according to the invention, and an improved motor vehicle can be provided in this way.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
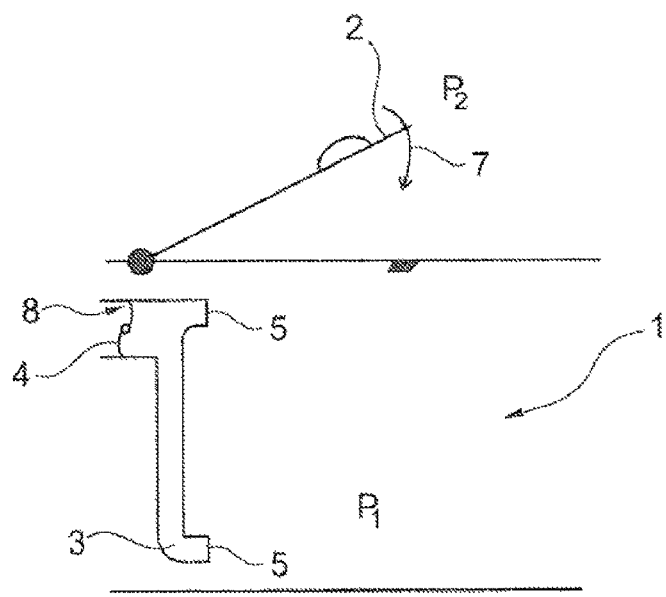
FIGS. 1A and 1B are schematic diagrams of a vehicle interior with an open (FIG. 1A) and closed (FIG. 1B) vehicle door.

FIG. 1A shows an outline sketch of a vehicle interior 1. The vehicle interior 1 can be closed by way of the vehicle door 2. The vehicle door 2 is shown in an open position. The vehicle interior can be supplied with fresh air from outside by way of a ventilation/climate control system 3. In the standstill mode of the vehicle, the ventilation/climate control system 3 is closed to the outside by way of the flap device 4. By way of the ventilation/climate control system 3, an air flow into the vehicle interior can be generated through a plurality of ventilation nozzles 5. The flap device 4 is arranged in the air inlet opening 8. For closure, the vehicle door 2 is moved in the movement direction 7. The ambient pressure $P_2$ prevails outside the vehicle interior 1. The internal pressure $P_1$ prevails within the vehicle interior 1. When the vehicle door 2 is open, $P_1$ and $P_2$ are of identical magnitude.

Figure 1B:
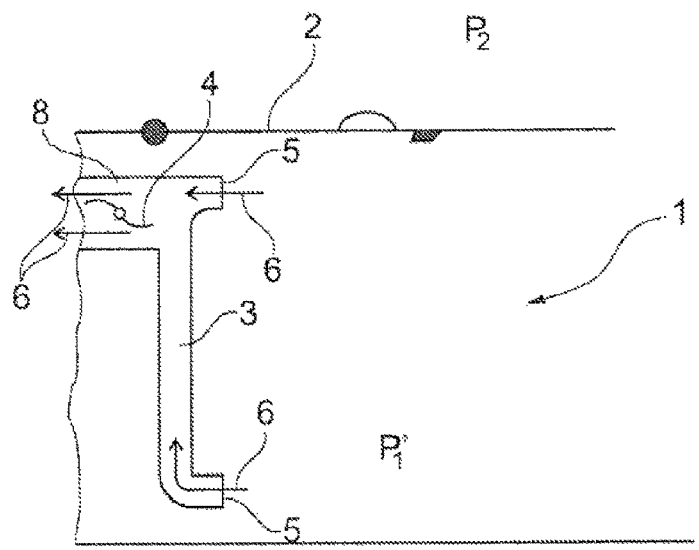

FIG. 1B shows the situation at the moment at which the door 2 is closed. The ambient pressure $P_2$ remains unchanged. An increased pressure $P_1'$ is generated within the vehicle interior 1 by way of the closure of the vehicle door 2. According to the invention, the flap device 4 is opened and therefore the air inlet opening 8 is released. A pressure equalization air flow 6 can be formed through the nozzles 5 by way of the opening of the flap device 4. Here, the pressure equalization air flow 6 discharges air from within the vehicle interior 1 to the outside.

Figure 2:
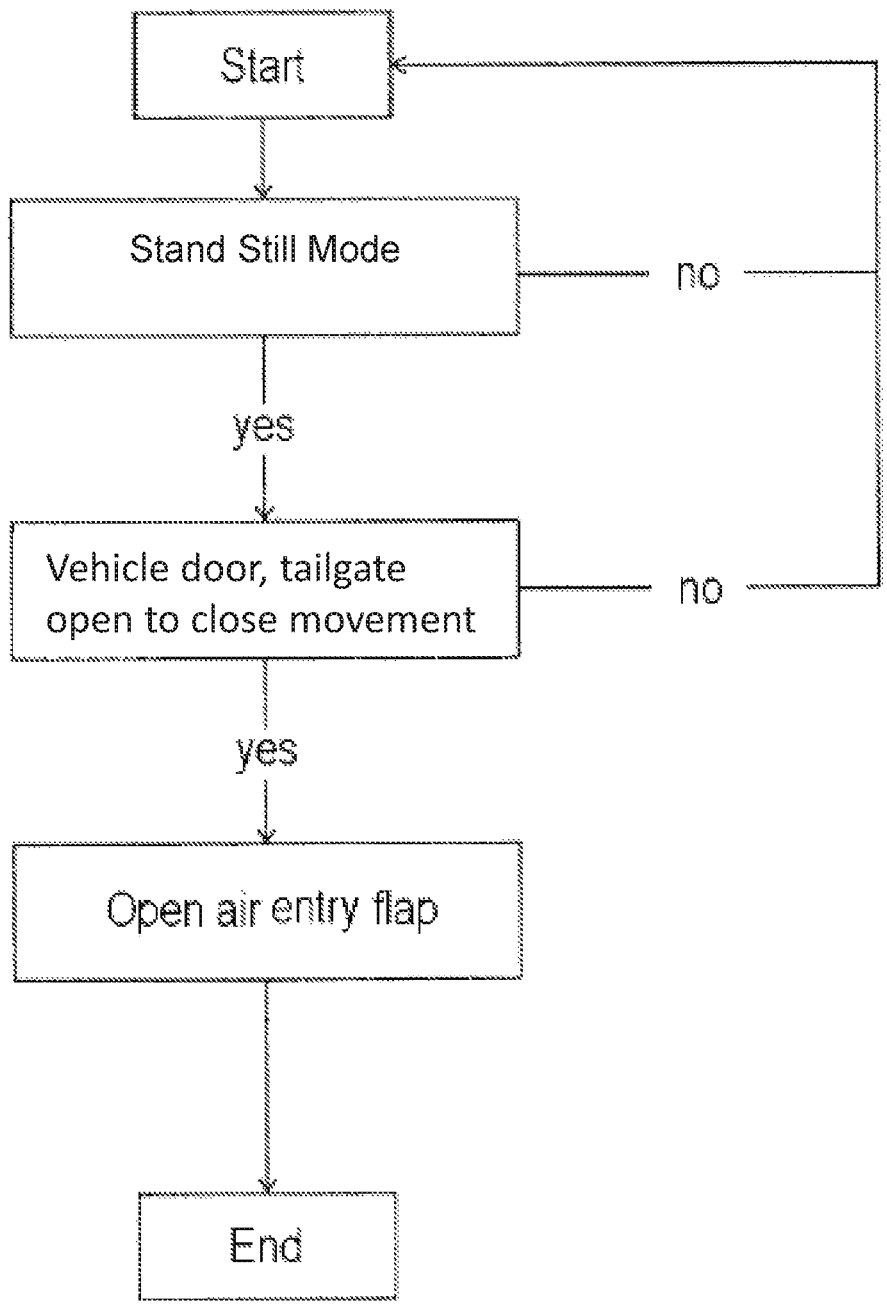
FIG. 2 is a flow chart for a method according to an embodiment of the invention.

FIG. 2 shows a simplified flow chart for the method according to an embodiment of the invention. First of all, it is detected whether the vehicle is situated in a vehicle standstill mode. The fact as to whether occupants are still situated in the vehicle interior and whether the drive system of the vehicle is activated is used to this end, in particular. Furthermore, the fact as to whether the ventilation system is activated, that is to say whether an air flow is conveyed from outside the vehicle interior into it, can be used. If there are therefore no longer any occupants in the vehicle interior and if the drive system of the motor vehicle is deactivated, for a motor vehicle having a conventional internal combustion engine, this would mean that the ignition is switched off (in contrast to switching off the drive system via an automatic engine start/stop system); a vehicle standstill mode is then detected. Furthermore, it is detected whether a single vehicle door is open or whether, in the case of closed vehicle doors, the tailgate is open. If both a vehicle standstill mode is present and it is the case that only a single vehicle door or only the tailgate is open, a control command is output, with the result that the air entry flap is opened and therefore a pressure equalization air flow through the air inlet opening out of the vehicle interior is made possible during the closure of the vehicle door or tailgate.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for equalizing cabin pressure of a vehicle having a an air inlet system, the air inlet system including an air inlet opening and a closure device controllable to open/close and thereby permit/block air flow to be conveyed through the air inlet opening into the vehicle interior by way of the air inlet system from outside the vehicle interior, the method comprising the acts of:
    detecting that the vehicle is in a standstill mode and that only a single vehicle door/tailgate is in an open position moving towards a closed position;
    in response to the detection, controlling the closure device to open and thereby permit airflow to be conveyed from outside the vehicle interior to inside the vehicle interior via the air inlet opening; and
    controlling the closure device to remain open through closure of the single vehicle door/tailgate for the purpose of equalizing cabin pressure.

2. The method as claimed in claim 1, wherein the air flow is conveyed through the air inlet opening out of the vehicle interior to the outside by way of a fan device if the closure device is open at least partially or completely.

3. The method as claimed in claim 1, wherein after the closure of the single vehicle door/tailgate, the closure device remains open for a defined dead time, and further wherein the closure device is closed after the defined dead time.

4. The method as claimed in claim 2, wherein after the closure of the single vehicle door/tailgate, the closure device remains open for a defined dead time, and further wherein the closure device is closed after the defined dead time.

5. The method as claimed in claim 1, wherein the closure device comprises a circulation air flap that is configured to be opened in the air inlet system or in a climate control system.

6. The method as claimed in claim 3, wherein the closure device comprises a circulation air flap that is configured to be opened in the air inlet system or in a climate control system.

7. The method as claimed in claim 1, wherein the single vehicle door/tailgate is configured to close an opening in the vehicle interior for loading or unloading the vehicle or for entering or exiting the vehicle.

8. A motor vehicle, comprising:
    a vehicle interior that is closable by way of at least one vehicle door/tailgate;
    a ventilation system configured to ventilate a vehicle interior and having an air inlet opening which is closable selectively by way of a closure device,
    wherein the closure device is controlled, via a controller, to open the air inlet opening in response to a sensor system detecting that the vehicle is in a standstill mode and that only a single vehicle door/tailgate is in an open position moving towards a closed position, and
    wherein the closure device is further controlled to remain open through the closure of the single vehicle door/tailgate for the purpose of equalizing cabin pressure.

* * * * *